United States Patent
Ribarov et al.

(10) Patent No.: US 10,400,620 B2
(45) Date of Patent: Sep. 3, 2019

(54) ADJUSTABLE BLADE OUTER AIR SEAL SYSTEM

(71) Applicant: United Technologies Corporation, Farmington, CT (US)

(72) Inventors: Lubomir A. Ribarov, West Hartford, CT (US); Charles W. Haldeman, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 321 days.

(21) Appl. No.: 15/228,664

(22) Filed: Aug. 4, 2016

(65) Prior Publication Data

US 2018/0038238 A1 Feb. 8, 2018

(51) Int. Cl.
*F01D 11/20* (2006.01)
*F01D 21/00* (2006.01)
(Continued)

(52) U.S. Cl.
CPC .............. *F01D 11/20* (2013.01); *F01D 5/12* (2013.01); *F01D 11/22* (2013.01); *F01D 17/02* (2013.01);
(Continued)

(58) Field of Classification Search
CPC . F01D 5/12; F01D 11/08; F01D 11/20; F01D 11/22; F01D 21/003
See application file for complete search history.

(56) References Cited

U.S. PATENT DOCUMENTS 7,243,547 B2 7/2007 Cobianu et al.
8,186,945 B2 * 5/2012 Bhatnagar ............... F01D 11/22
                                                                415/173.1
(Continued)

FOREIGN PATENT DOCUMENTS

EP       2930313 A1    10/2015
WO    2014143934 A1    9/2014
(Continued)

OTHER PUBLICATIONS

European Search Report, European Application No. 17184815.3, dated Jan. 25, 2018, European Patent Office; European Search Report 6 pages.

*Primary Examiner* — Woody A Lee, Jr.
*Assistant Examiner* — Aye S Htay
(74) *Attorney, Agent, or Firm* — Cantor Colburn LLP

(57) ABSTRACT

Controlling BOAS-to-blade-tip clearances by measuring a blade clearance between a first primary BOAS and a blade with a distance measurement device attached to the first primary BOAS, determining if the measured blade clearance of the first primary BOAS is at a value corresponding to a first predetermined blade clearance, measuring a blade clearance of a first secondary BOAS that is circumferentially adjacent the first primary BOAS based on a position of the first primary BOAS when the blade clearance of the first primary BOAS is at the first predetermined blade clearance, determining if the measured blade clearance of the first secondary BOAS is at a value corresponding to the first predetermined blade clearance, and adjusting the position of the first secondary BOAS when the blade clearance of the first secondary BOAS is not at the first predetermined blade clearance with an actuator operably connected to the first secondary BOAS.

20 Claims, 7 Drawing Sheets

(51) Int. Cl.
  *F01D 5/12*   (2006.01)
  *F01D 11/22*  (2006.01)
  *F01D 17/02*  (2006.01)

(52) U.S. Cl.
  CPC ........ *F01D 21/003* (2013.01); *F05D 2220/32* (2013.01); *F05D 2240/11* (2013.01); *F05D 2240/307* (2013.01); *F05D 2270/44* (2013.01); *F05D 2270/62* (2013.01); *F05D 2270/66* (2013.01); *F05D 2270/80* (2013.01); *F05D 2270/821* (2013.01); *Y02T 50/671* (2013.01)

(56) References Cited

U.S. PATENT DOCUMENTS

| | | | |
|---|---|---|---|
| 8,998,572 | B2 | 4/2015 | Lutjen et al. |
| 2005/0069406 | A1* | 3/2005 | Turnquist ................ F01D 11/20 415/1 |
| 2005/0109039 | A1 | 5/2005 | Chehab et al. |
| 2009/0263247 | A1* | 10/2009 | Mollmann ............ F01D 21/003 416/144 |
| 2010/0247283 | A1* | 9/2010 | Andrew ................. F01D 11/14 415/1 |
| 2010/0303612 | A1 | 12/2010 | Bhatnagar et al. |
| 2015/0090017 | A1* | 4/2015 | Silieti ................... G01M 15/02 73/112.01 |
| 2015/0132108 | A1* | 5/2015 | Jones ................... G01B 11/002 415/118 |
| 2015/0242190 | A1 | 8/2015 | Roelle et al. |
| 2015/0322813 | A1* | 11/2015 | Tralshawala ............ F01D 17/04 415/118 |
| 2015/0323301 | A1* | 11/2015 | Zhe .......................... G01B 7/14 324/207.15 |
| 2016/0017743 | A1 | 1/2016 | Duguay |
| 2016/0053626 | A1 | 2/2016 | Blaney et al. |

FOREIGN PATENT DOCUMENTS

| | | |
|---|---|---|
| WO | 2015021222 A1 | 2/2015 |
| WO | 2015038906 A1 | 3/2015 |
| WO | 2015094622 A1 | 6/2015 |
| WO | 2015102953 A1 | 7/2015 |

\* cited by examiner

ADJUSTABLE BLADE OUTER AIR SEAL SYSTEM

BACKGROUND

The subject matter disclosed herein generally relates to gas turbine engines and, more particularly, to adjustable blade outer air seals for gas turbine engines.

Gas turbine engines are design to have minimal clearances between outer edges of turbine blades (blade tips) and inner surfaces of rotor case shrouds, i.e., blade outer air seals. With increased clearance comes more aerodynamic loss (inefficiency) commonly referred to as "tip leakage." The clearances between the blade tips and the inner surfaces of the blade outer air seals are often oversized to avoid undesirable abrasion ("rubbing") between these two components. The oversizing clearance gap is undesirable as it represents a loss in overall gas turbine engine cycle efficiency. This is especially pertinent to typical aero-gas turbine engines which operate in a typical open Brayton cycle and have no additional thermodynamic benefits that may be derived from, for example, recuperation, turbo-compounding, combining with other cycles (Rankine, Otto, Diesel, Miller, etc.), etc.

More emphasis of the main propulsion share of a gas turbine engine is shifted to the bypass air flow compared to the core air flow. Therefore, while the bypass fan increases in diameter, the engine's core is shrinking in diameter. Accordingly, all of the internal rotation components of the engine core are being reduced in size. As a result ever tighter internal clearances are desired to optimize the performance of the core of the gas turbine engine. Accordingly it may be desirable to improve optimization of the clearance.

SUMMARY

According to one embodiment, methods to control a blade outer air seal (BOAS)-to-blade-tip clearance of a gas turbine engine are provided. The method includes measuring a blade clearance between a first primary BOAS and a blade of the gas turbine engine with a first distance measurement device, determining if the measured blade clearance of the first primary BOAS is at a value corresponding to a first predetermined blade clearance, measuring a blade clearance of a first secondary BOAS that is circumferentially adjacent the first primary BOAS based on a position of the first primary BOAS when the blade clearance of the first primary BOAS is at the first predetermined blade clearance, determining if the measured blade clearance of the first secondary BOAS is at a value corresponding to the first predetermined blade clearance, and adjusting the position of the first secondary BOAS when the blade clearance of the first secondary BOAS is not at the first predetermined blade clearance with an actuator operably connected to the first secondary BOAS.

In addition to one or more of the features described above, or as an alternative, further embodiments of the method may include that the first distance measurement device is attached to the first primary BOAS.

In addition to one or more of the features described above, or as an alternative, further embodiments of the method may include adjusting the position of the first primary BOAS with an actuator operably connected to the first primary BOAS when the measured blade clearance of the first primary BOAS is not at a value corresponding to the first predetermined blade clearance.

In addition to one or more of the features described above, or as an alternative, further embodiments of the method may include measuring a blade clearance of a second secondary BOAS that is circumferentially adjacent the first secondary BOAS based on a position of the first secondary BOAS when the measured blade clearance of the first secondary BOAS is at a value corresponding to the first predetermined blade clearance.

In addition to one or more of the features described above, or as an alternative, further embodiments of the method may include adjusting a number of secondary BOAS with associated actuators such that each secondary BOAS is positioned at a value corresponding to the first predetermined blade clearance, wherein the position of each secondary BOAS is based on the position of the first primary BOAS.

In addition to one or more of the features described above, or as an alternative, further embodiments of the method may include that the number of secondary BOAS are located between the first primary BOAS and a second primary BOAS, the method further comprising confirming the position of a secondary BOAS adjacent to the second primary BOAS based on a position of the second primary BOAS.

In addition to one or more of the features described above, or as an alternative, further embodiments of the method may include that measuring the blade clearance of the first secondary BOAS comprises using an edge position sensor installed on the first secondary BOAS.

In addition to one or more of the features described above, or as an alternative, further embodiments of the method may include that measuring the blade clearance of the first secondary BOAS comprises detecting a signal strength between an edge position sensor on a circumferentially facing edge of the first primary BOAS and an edge position sensor on an adjacent circumferentially facing edge of the first secondary BOAS.

In addition to one or more of the features described above, or as an alternative, further embodiments of the method may include powering the edge position sensors wirelessly from an antenna.

In addition to one or more of the features described above, or as an alternative, further embodiments of the method may include measuring a blade clearance between a second primary BOAS and a blade of the gas turbine engine with a second distance measurement device, determining if the measured blade clearance of the second primary BOAS is at a value corresponding to a second predetermined blade clearance, measuring a blade clearance of a second secondary BOAS that is circumferentially adjacent the second primary BOAS based on a position of the second primary BOAS when the blade clearance of the second primary BOAS is at the second predetermined blade clearance, determining if the measured blade clearance of the second secondary BOAS is at a value corresponding to the second predetermined blade clearance, and adjusting the position of the second secondary BOAS when the blade clearance of the second secondary BOAS is not at the second predetermined blade clearance with an actuator operably connected to the second secondary BOAS.

In addition to one or more of the features described above, or as an alternative, further embodiments of the method may include that the first distance measurement device is at least one of a proximity probe, a laser device, an acoustic device, or a pressure device.

According to another embodiment, blade outer air seal (BOAS) blade-tip clearance systems of gas turbine engines are provided. The BOAS blade-tip clearance system includes a first primary BOAS having an inner diameter surface and an outer diameter surface relative to an engine axis. The first primary BOAS has an actuator operably coupled to the outer diameter surface of the first primary BOAS and operable to move the first primary BOAS at least toward or away from the engine axis, and at least one edge position sensor located on a circumferentially facing edge of the first primary BOAS. A first distance measurement device is configured to detect and measure a distance from the inner diameter surface of the first primary BOAS to a blade tip of a blade of the gas turbine engine. The system further includes a first secondary BOAS having an inner diameter surface and an outer diameter surface relative to an engine axis and circumferentially adjacent the first primary BOAS. The first secondary BOAS has an actuator operably coupled to the outer diameter surface of the first secondary BOAS and operable to move the first secondary BOAS at least toward or away from the engine axis and at least one edge position sensor located on a circumferentially facing edge of the first secondary BOAS. The system further includes a BOAS clearance controller configured to control the actuators of the first primary BOAS and the first secondary BOAS.

In addition to one or more of the features described above, or as an alternative, further embodiments of the system may include that the first distance measurement device is attached to the first primary BOAS In addition to one or more of the features described above, or as an alternative, further embodiments of the system may include that the BOAS clearance controller is configured to measure a blade clearance between the first primary BOAS and a blade of the gas turbine engine using the first distance measurement device, determine if the blade clearance of the first primary BOAS is at a first predetermined blade clearance, measure a blade clearance of the first secondary BOAS that is based on a position of the first primary BOAS and the edge position sensors when the blade clearance of the first primary BOAS is at the first predetermined blade clearance, determine if the blade clearance of the first secondary BOAS is at the first predetermined blade clearance, and adjust the position of the first secondary BOAS by controlling the actuator of the first secondary BOAS when the blade clearance of the first secondary BOAS is not at the first predetermined blade clearance.

In addition to one or more of the features described above, or as an alternative, further embodiments of the system may include that, when the blade clearance of the first primary BOAS is not at the first predetermined blade clearance, the BOAS clearance controller controls the actuator of the first primary BOAS to adjust the position of the first primary BOAS.

In addition to one or more of the features described above, or as an alternative, further embodiments of the system may include that, when the blade clearance of the first secondary BOAS is at the first predetermined blade clearance, the BOAS clearance controller is configured to measure a blade clearance of a second secondary BOAS that is circumferentially adjacent the first secondary BOAS based on a position of the first secondary BOAS.

In addition to one or more of the features described above, or as an alternative, further embodiments of the system may include a number of secondary BOAS, wherein the BOAS clearance controller is configured to adjust a number of secondary BOAS such that each secondary BOAS is at the first predetermined blade clearance, wherein the position of each secondary BOAS is based on the position of the first primary BOAS.

In addition to one or more of the features described above, or as an alternative, further embodiments of the system may include a second primary BOAS, wherein the number of secondary BOAS are located between the first and second primary BOAS, wherein the BOAS clearance controller confirms the position of a secondary BOAS adjacent to the second primary BOAS based on a position of the second primary BOAS.

In addition to one or more of the features described above, or as an alternative, further embodiments of the system may include that measuring the blade clearance of the first primary BOAS comprises using the first distance measurement device.

In addition to one or more of the features described above, or as an alternative, further embodiments of the system may include that measuring the blade clearance of the first secondary BOAS comprises detecting a signal strength between the edge position sensors on the first primary BOAS and the first secondary BOAS.

In addition to one or more of the features described above, or as an alternative, further embodiments of the system may include at least one antenna configured to wirelessly power the edge position sensors.

In addition to one or more of the features described above, or as an alternative, further embodiments of the system may include a second primary BOAS and a second secondary BOAS, wherein the second primary BOAS is configured to be set to a second predetermined blade clearance, and the second secondary BOAS is configured to be adjusted to the second predetermined blade clearance based on the second primary BOAS.

In addition to one or more of the features described above, or as an alternative, further embodiments of the system may include a second distance measurement device attached to the second primary BOAS.

In addition to one or more of the features described above, or as an alternative, further embodiments of the system may include that the first distance measurement device is at least one of a proximity probe, a laser device, an acoustic device, or a pressure device.

Technical effects of embodiments of the present disclosure include adjustable blade outer air seals of gas turbine engines thus reducing leakage losses, such as continuously adjusted or need-based adjustments. Further technical effects include at least one primary BOAS that is positioned based on a distance measurement device and one or more secondary BOAS that are position based on the position of the primary BOAS and the use of edge position sensors.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
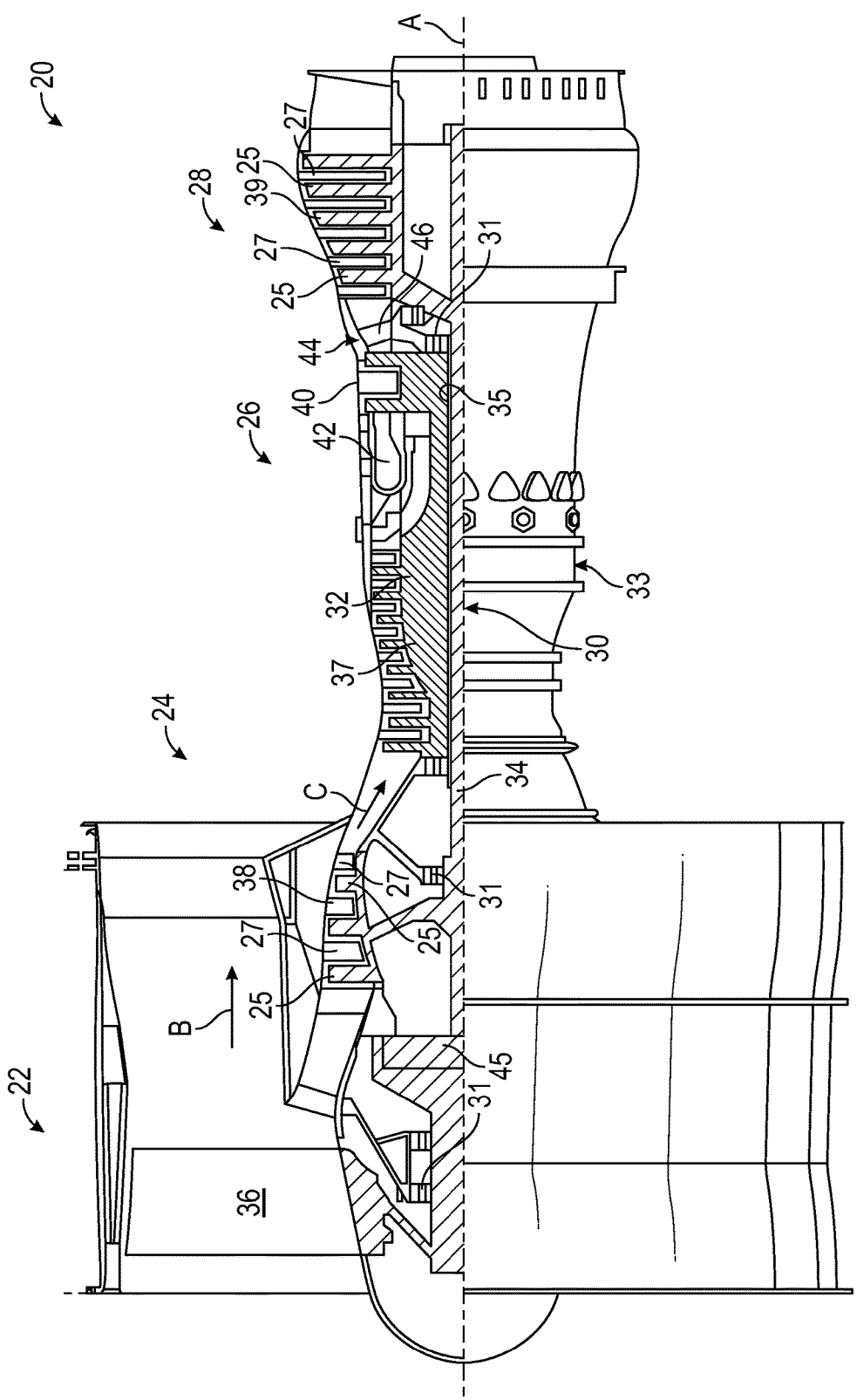
FIG. 1A is a schematic cross-sectional illustration of a gas turbine engine architecture that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion of the combustion gases from the combustor 42.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
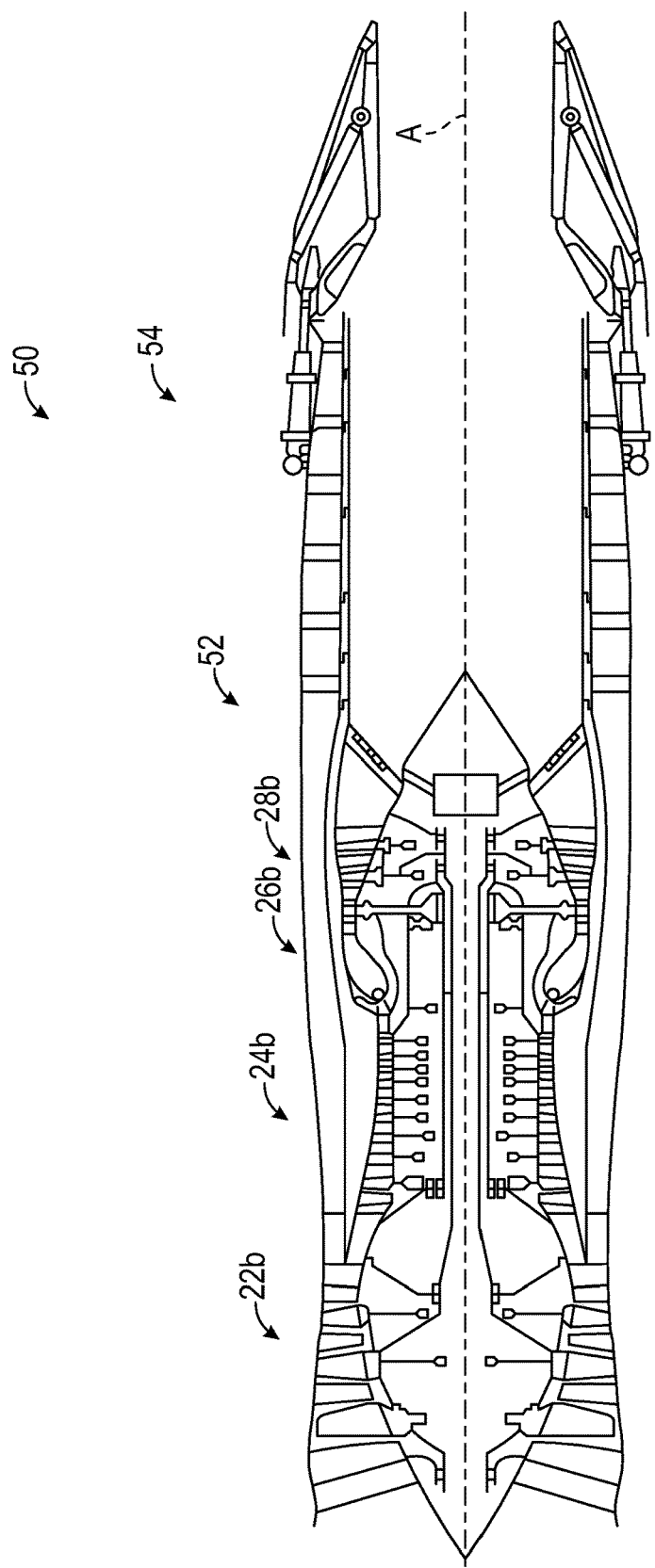
FIG. 1B is a schematic cross-sectional illustration of another gas turbine engine architecture that may employ various embodiments disclosed herein.

Referring to FIG. 1B, an alternative engine architecture of a gas turbine engine 50 may also include an augmentor section 52 and an exhaust duct section 54 among other systems or features. Otherwise, the engine architecture of the gas turbine engine 50 may be similar to that shown in FIG. 1A. That is, the gas turbine engine 50 includes a fan section 22b that drives air along a bypass flowpath while a compressor section 24b drives air along a core flowpath for compression and communication into a combustor section 26b then expansion through a turbine section 28b.

Although two architectures for gas turbine engines are depicted (e.g., high bypass turbofan in FIG. 1A, low bypass augmented turbofan FIG. 1B) in the disclosed non-limiting embodiments, it should be understood that the concepts described herein are not limited to use with the shown and described configurations, as the teachings may be applied to other types of gas turbine engines such as, but not limited to, geared/non-geared turbojets, turboshafts, geared/non-geared three-spool (plus fan) turbofans, and turboprop engines (e.g., pusher, tug, etc.) wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
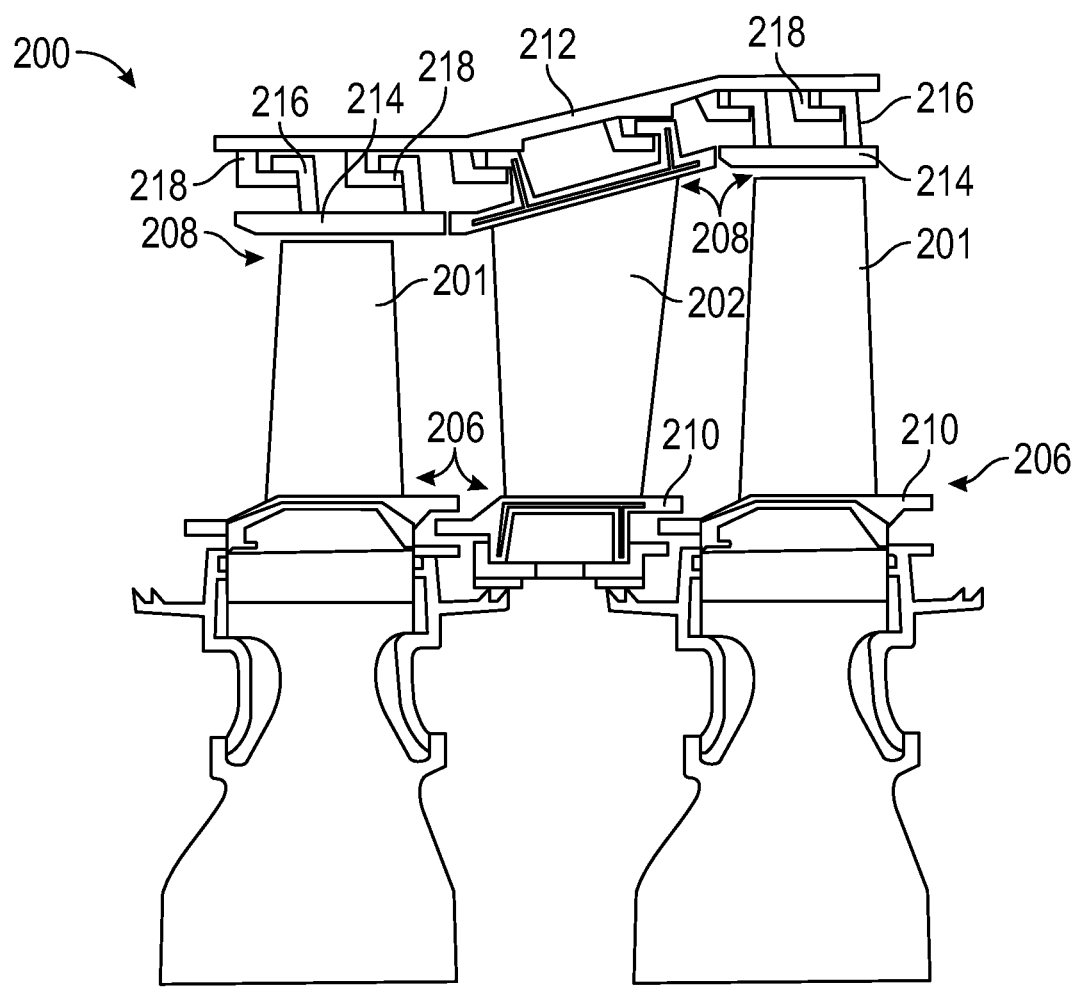
FIG. 2 is a schematic illustration of a section of a gas turbine engine that may employ various embodiments disclosed herein.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the airfoils 201, 202 that may extend either from the inner diameter 206 or the outer diameter 208 of the airfoil 201, 202. The partitions may extend for a portion of the length of the airfoil 201, 202, but may stop or end prior to forming a complete wall within the airfoil 201, 202. Thus, each of the airfoil cavities may be fluidly connected and form a fluid path within the respective airfoil 201, 202. The blades 201 and the vanes may include platforms 210 located proximal to the inner diameter thereof. Located below the platforms 210 may be airflow ports and/or bleed orifices that enable air to bleed from the internal cavities of the airfoils 201, 202. A root of the airfoil may connected to or be part of the platform 210.

The turbine 200 is housed within a case 212, which may have multiple parts (e.g., turbine case, diffuser case, etc.). In various locations, components, such as seals, may be positioned between airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

The circumferential (radial) distribution of blade tip-to-BOAS clearance may not be uniform about the circumference of the turbine. Such non-uniformities can persist during an engine transient (e.g., take-off, step-climb, slam acceleration, thrust reverse, etc.) as well as during steady state engine operation (i.e., cruise flight). The non-uniformities may result from thermal gradients in the rotor case due to non-uniform heating and cooling, or from various structural stresses that may be inducing a variety of torsion moments about the case. The BOAS, which are suspended from the hooks (which are in turn attached to the case) can therefore exhibit differential radial positioning around the rotor blades. This leads to undesirably large and uneven clearances which are, in essence, an aerodynamic loss mechanism. It is desirable to avoid such losses.

Figure 3A:
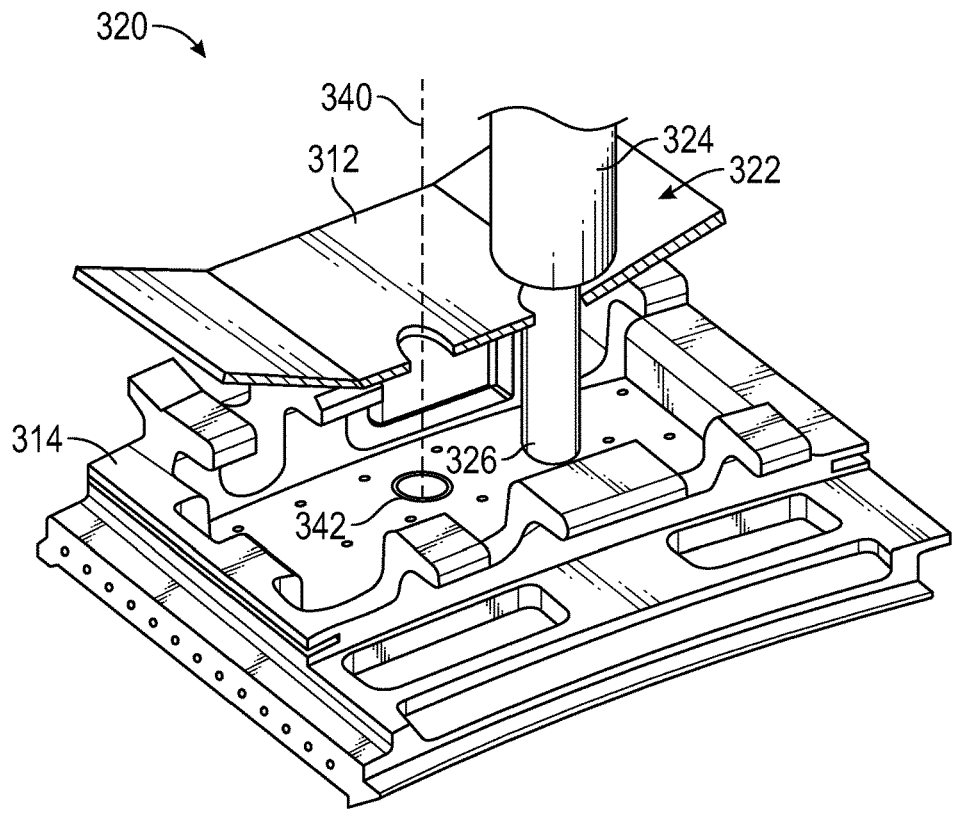
FIG. 3A is a perspective illustration of an embodiment of blade outer air seal (BOAS) blade-tip clearance system constructed in accordance with an embodiment of the present disclosure, showing an actuator connected to a BOAS.
Figure 3B:
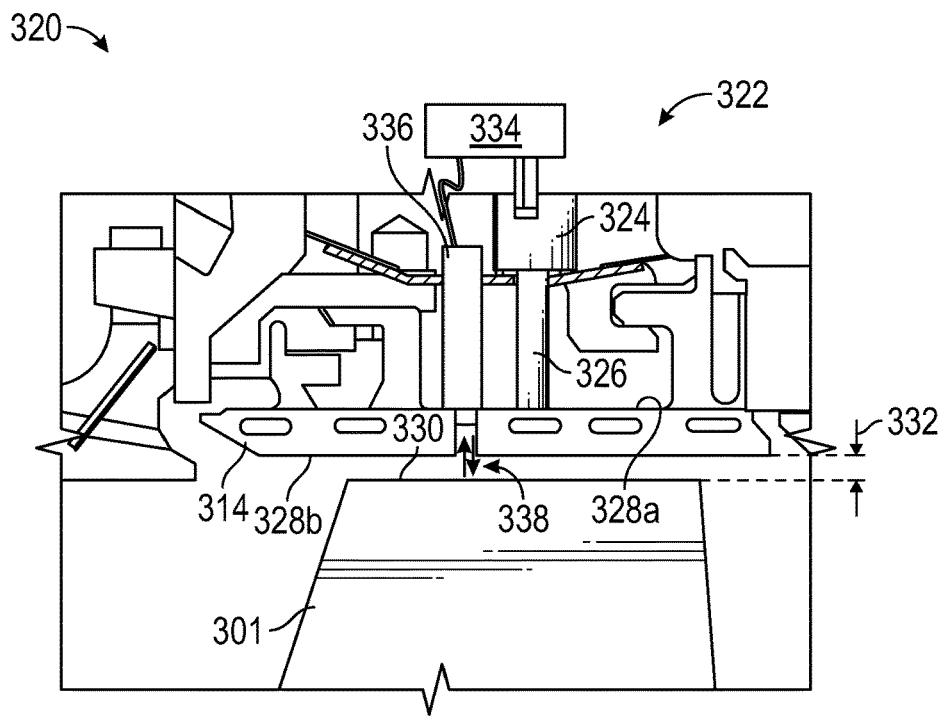
FIG. 3B is a partial, cross-sectional illustration of the BOAS blade-tip clearance system of FIG. 3A.

Turning now to FIGS. 3A-3B, a non-limiting example embodiment of a BOAS blade-tip clearance system is illustrated. FIG. 3A is a partial cut-away isometric illustration of a BOAS blade-tip clearance system 320 and FIG. 3B is a partial, cross-sectional illustration of the BOAS blade-tip clearance system 320 of FIG. 3A.

As shown, the BOAS blade-tip clearance system 320 includes an actuator 322 having an anchor portion 324 for fixation to an interior surface of a case or housing 312 and an actuating portion 326 for actuating movement relative to the anchor portion 324. The BOAS blade-tip clearance system 320 includes an operably connected or coupled BOAS 314, wherein the actuating portion 326 is operably coupled to an outer diameter surface 328a of the BOAS 314. The actuating portion 326 of the actuator 322 is configured to move relative to the case 312 to adjust a distance between a BOAS inner diameter surface 328b of the BOAS 312 and a blade tip 330 of a blade 301 (shown in FIG. 3B). The BOAS blade-tip clearance system 320 is configured to maintain a predetermined blade clearance 332 (shown in FIG. 3B) between the BOAS inner diameter surface 328b and the blade tip 330.

The BOAS 314 can be any suitable blade outer air seal such as, but not limited to, a ceramic coated (e.g., TBC) turbine blade outer air seal. The actuating portion 326 can be attached to the BOAS 314 in any suitable manner, including, but not limited to, adhesion, welding, bolting, fastening, and the like, and/or any combination thereof. The actuator 322 can be configured to move (e.g., toward or away from the blade tip 330) the BOAS 314 in any suitable increment or distance at any suitable speed.

The actuator 322 of the BOAS blade-tip clearance system 320 can be controlled via a BOAS clearance controller 334. The actuator controller can be a mechanical system, electromechanical system, or electrical circuit attached to the actuator 322. In some embodiments, the actuator 322 can be hard wired or controlled wirelessly via any suitable control mechanism (e.g., BOAS clearance controller 334). The BOAS clearance controller 334 can have memory operatively connected to cause execution of a control algorithm by the BOAS clearance controller 334 to cause actuation of the actuating portion 326 to move the BOAS 314 to a predicted position for a desired blade clearance 332 based on at least one input. The at least one input can be one or more of blade rotational speed, temperature, pressure, blade acceleration, thrust input and/or relative position to an adjacent BOAS, as described herein.

In some embodiments, the BOAS blade-tip clearance system 320 further includes at least one distance measurement device 336 configured to detect and measure the blade clearance 332. The distance measurement device 336 can be any device configured to measure a distance or relative distance between two or more components. The distance measurement device can be, but is not limited to, a proximity probe, laser device, acoustic device, pressure device, etc. For example, the distance measurement device can be configured to perform laser diagnostics/ranging, acoustic detection, pressure change detection, leakage flow detection, etc. The distance measurement device 336 can be operatively connected to the BOAS clearance controller 334 for actuation of the actuating portion 326 to move the BOAS 314 to a desired position for a desired blade clearance 332 based on a sensed blade clearance 332. In some embodiments, the distance measurement devices can be attached to or coupled with the BOAS. In other embodiments, the distance measurement device can be separate from the BOAS. In various configurations, the distance measurement device is configured to continuously or periodically measure a blade clearance distance or separation between a blade tip and a BOAS inner diameter surface.

As shown, the distance measurement device 336 can emit a probe signal 338, such as an optical, IR, or other type of range detection signal. In one non-limiting example, the distance measurement device 336 can be configured to both emit the probe signal 338 and also receive a reflection of the probe signal 338 as it reflects from the blade tip 330, and thus a distance between the distance measurement device 336 and the blade tip 330 can be calculated. From this, a processor (e.g., within the BOAS clearance controller 334) can calculate the blade clearance 332. The calculated blade clearance 332 can then be used to adjust the position of the BOAS 314 relative to the blade 301, and thus adjust the blade clearance 332.

As shown in FIG. 3A, the distance measurement device 336 is omitted such that a probe axis 340 can be illustrated. The probe axis 340 is a line that extends along an axis or length of the distance measurement device 336 (e.g., radial relative to an engine axis (e.g., axis A of FIGS. 1A-1B). Also shown in FIG. 3A is a probe port 342 that is formed within the BOAS 314 to enable the probe signal 338 to interact with the blade tip 330.

In accordance with some embodiments of the present disclosure, additional sensors or probes can be employed as described herein. For example, a compact light-weight sensor can be embedded into the edges of the BOAS (i.e. edge position sensors) as described herein. Because the BOAS are installed within a circular engine and are circumferentially disposed about an engine axis, as known to those of skill in the art, the edge position sensors can be installed in axially extending, circumferentially facing edges of the BOAS. The edge position sensors can periodically or continuously monitor the relative radial position of adjacent BOAS. Accordingly, when one BOAS moves upward or downward relative to another BOAS, a BOAS blade-tip clearance system can move one of the BOAS until adjacent BOAS are level, and thus a desired blade clearance can be maintained for multiple BOAS.

In some embodiments, a single edge position sensor can be configured or installed along an edge of a BOAS on each side (e.g., in a circumferential direction with respect to an engine axis). Adjacent edge position sensors can interact such that a signal is generated and detectable, wherein the signal strength is proportional to the relative distance or separation between the adjacent BOAS. In other embodiments, multiple edge position sensors can be installed along a single side or edge of BOAS, and can be configured or positioned that two different signals can be generated between adjacent edge position sensors of adjacent BOAS. In such a configuration, by monitoring or measuring the signals of the two different signals can indicate a direction of movement and thus can be used to determine if one specific BOAS is relatively higher or relatively lower than an specific adjacent BOAS. Accordingly, when the direction or relative position is known, the appropriate adjustment by an actuator (e.g., inward or outward) can be carried out efficiently.

Figure 4A:
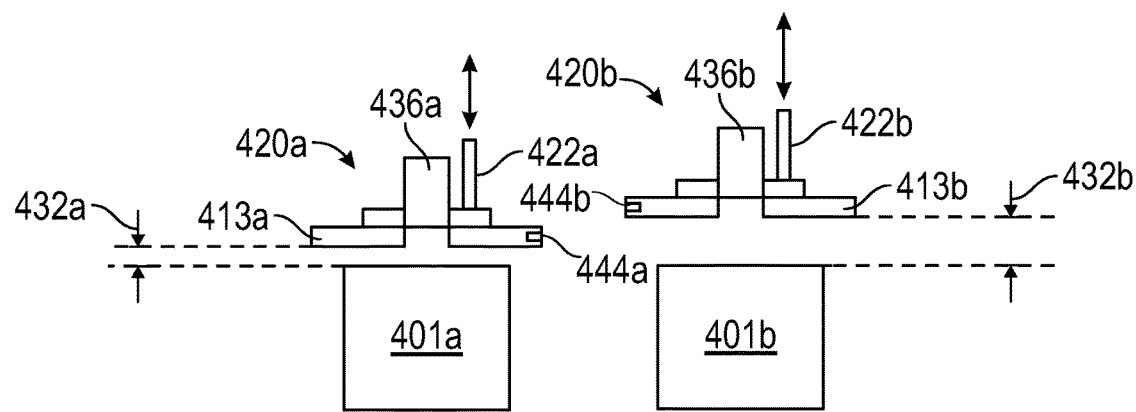
FIG. 4A is a schematic side view of two adjacent BOAS in accordance with an embodiment of the present disclosure illustrating a separation in position.
Figure 4B:
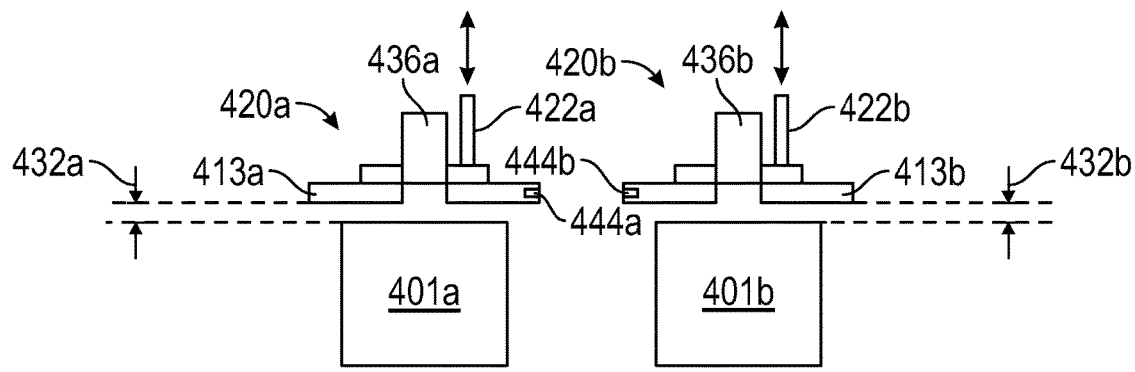
FIG. 4B is a schematic illustration of the adjacent BOAS of FIG. 4A as aligned through employing embodiments of the present disclosure.

Turning now to FIGS. 4A-4B, schematic illustrations of the operation of a BOAS blade-tip clearance system 420 in accordance with a non-limiting example embodiment of the present disclose are shown. FIGS. 4A-4B illustrate two adjacent blades 401a, 401b, with each blade 401a, 401b having a respective adjustable BOAS 413a, 413b. Each adjustable BOAS 413a, 413b is configured with a respective BOAS blade-tip clearance system 420a, 420b. The BOAS blade-tip clearance systems 420a, 420b are configured as described above. Thus, each BOAS blade-tip clearance system 420a, 420b includes an actuator 422a, 422b and a distance measurement devices 436a, 436b that are configured to measure a respective blade clearance 432a, 432b. As shown, the BOAS blade-tip clearance systems 420a, 420b each includes an edge position sensor 444a, 444b. The edge position sensors 444a, 444b can be configured to detect a relative position or alignment between the adjacent adjustable BOAS 413a, 413b, and thus can monitor the blade clearances 432a, 432b.

As shown in FIG. 4A, the first adjustable BOAS 413a and the second adjustable BOAS 413b are at two difference radial locations (e.g., with respect to an engine axis) and two difference distances relative to blades 401a, 401b. FIG. 4B illustrates the first adjustable BOAS 413a and the second adjustable BOAS 413b at the same radial locations (e.g., with respect to the engine axis) and the blade clearances 432a, 432b to the respective blades 401a, 401b are the same.

An initial measurement of the proper clearance may be determined with a single blade tip distance measurement device. For example, with reference to FIG. 4A, a first blade clearance 432a can be set and known to be a desired blade clearance. Accordingly, a first distance measurement device 436a can be used to measure the distance to a tip of a first blade 401a. If the first distance measurement device 436a is not at the desired blade distance, the first actuator 422a can be used to adjust the position of the first adjustable BOAS 413a to achieve a desired blade distance, and thus set the first blade distance 432a at an appropriate distance. The first actuator 422a can be used to adjust the first adjustable BOAS 413a upward (e.g., away from the first blade 401a) or downward (e.g., toward the first blade 401a) to achieve the desired blade distance.

Those of skill in the art will appreciate that there can be any number of adjustable BOAS in a gas turbine engine turbine blade configuration. Thus, using several blade tip distance measurement deviced (e.g., distance measurement devices 436a, 436b) equidistantly located around the circumference of the case will improve the fidelity of the blade tip-to-BOAS clearance measurement while eliminating a large number of additional blade tip clearance probes (i.e., not every adjustable BOAS in a gas turbine engine turbine may require or have installed a distance measurement device). In the embodiment of FIGS. 4A-4B, the two adjacent adjustable BOAS 413a, 413b each have a respective BOAS blade-tip clearance system 420a, 420b.

As shown, the adjacent, second adjustable BOAS 413a has a second blade clearance 432b separating the second adjustable BOAS 413b from a second blade 401b. A goal of the BOAS blade-tip clearance systems 420a, 420b is to have each adjustable BOAS 413a, 413b have the same blade clearance. Thus, as shown in FIG. 4A, the blade clearances 432a, 432b are different, with the second blade clearance 432b greater than the first blade clearance 432a. Because of this, it is known that the second blade clearance 432b is too great and the second adjustable BOAS 413b must be adjusted in position relative to the second blade 401a.

In the embodiment of FIGS. 4A-4B, the second adjustable BOAS 413b is adjusted downward and toward the second blade 401b by the associated second actuator 422b. One method to confirm the position of the second adjustable BOAS 413b is by use of a second distance measurement device 436b of the second BOAS blade-tip clearance system 420b. However, as noted above, not all adjustable BOAS need be equipped with a distance measurement device. In such configurations, or in combination with a distance measurement device, the position of two adjacent BOAS can be detected or measured using edge position sensor 444a, 444b of the adjacent BOAS blade-tip clearance systems 420a, 420b.

In some embodiments, the edge position sensors 444a, 444b are configured to detect when the two adjustable BOAS 413a, 413b are aligned and thus the first blade clearance 432a and the second blade clearance 432b are the same. The detection and relative positions of the two adjustable BOAS 413a, 413b can be proportional to a signal strength of the edge position sensors 444a, 444b. As shown in FIG. 4B, the second adjustable BOAS 413b is moved downward by the second actuator 422b and the signal strength of the edge position sensors 444a, 444b indicates that the two adjustable BOAS 413a, 413b are now aligned and the blade clearances 432a, 432b are the same.

Figure 5:
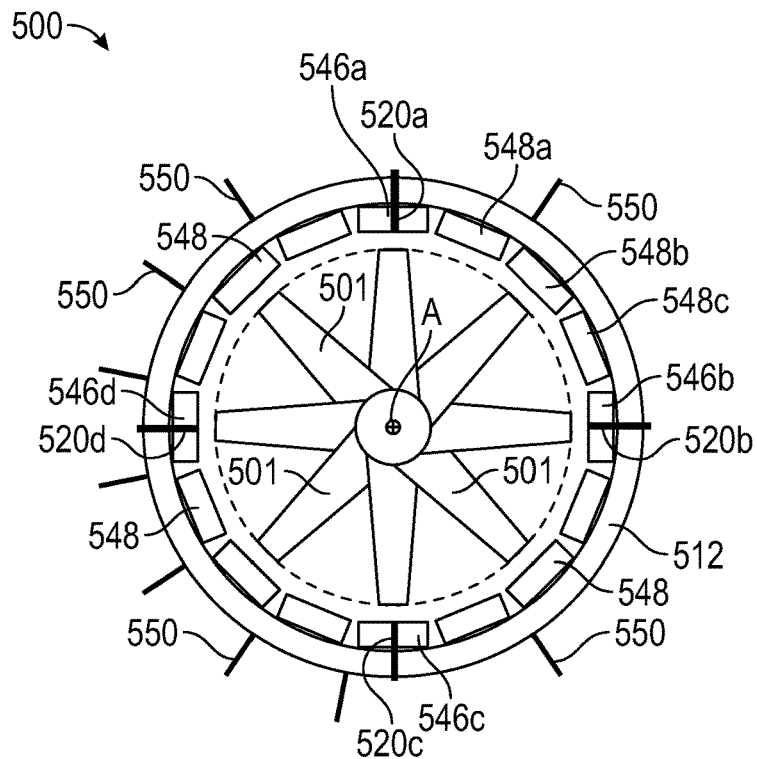
FIG. 5 is a schematic illustration of a gas turbine engine configured with a non-limiting embodiment of the present disclosure.

Turning now to FIG. 5, a non-limiting configuration of a rotor case 512 of a gas turbine engine 500 in accordance with an embodiment of the present disclosure is shown. The engine 500 includes a plurality of blades 501 disposed radially about an engine axis A. Although shown with only eight blades 501, those of skill in the art will appreciate that any number of blades can be employed on a rotor of a gas turbine engine, and thus FIG. 5 is merely illustrative and not to be limiting.

FIG. 5 illustrates a proposed implementation for adjusting some or all BOAS in a rotor section of the engine 500 to maintain a desired blade clearance for each BOAS in the engine 500. In the embodiment of FIG. 5, there are four BOAS blade-tip clearance systems 520a, 520b, 520c, 520d (collectively 520) located equidistantly from each other at 90° intervals around the rotor case 512. Each BOAS blade-tip clearance system 520 is associated with a respective primary adjustable BOAS 546a, 546b, 546c, 546d (collectively 546). Each primary adjustable BOAS 546 includes an actuator, a distance measurement device, and edge position sensors on both sides or edges of the respective BOAS.

Located between the primary adjustable BOAS are a plurality of secondary adjustable BOAS 548. Each secondary adjustable BOAS 548 includes an actuator and edge position sensors, but does not include distance measurement devices. The edge position sensors of the primary and secondary adjustable BOAS 546, 548 are configured to communicate with one or more antennas 550. The antennas 550 are disposed about the case 512 and are each in communication with one or more controllers or a control system (e.g., a BOAS clearance controller). Further, in some configurations, the antennas 550 can be used to power the edge sensors of the BOAS, as described herein.

Such configuration of primary and secondary adjustable BOAS can provide capability to detect "out-of-roundness" (e.g., oval-shaping) of the BOAS 546, 548. That is, detection and prevention of out-of-roundness of the BOAS with respect to clearance to blade tips of the blades 501 which can cause second order effects on the case 512. Other architectures, using a different number of blade tip clearance probes (e.g., primary adjustable BOAS) without departing from the scope of the present disclosure. In the following discussion, a clearance adjusting operation in accordance with a non-limiting embodiment of the present disclosure will be discussed with respect to FIG. 5. Specifically, in the following discussion, reference will be made to a first primary adjustable BOAS 546a, a first secondary adjustable BOAS 548a, a second secondary adjustable BOAS 548b, a third secondary adjustable BOAS 548c, and a second primary adjustable BOAS 546b.

Initially, a proper blade clearance will be set or established at the first primary adjustable BOAS 546a. Adjusting of the first primary adjustable BOAS 546a can be achieved through detection of a blade clearance using a distance measurement device and then adjusting the BOAS relative to a blade tip to achieve the desired blade clearance. Once the proper blade clearance is established at the first primary adjustable BOAS 546a (e.g., the BOAS at 12 o'clock position around the case 512), the blade clearance of the first primary adjustable BOAS 546a can be "re-checked" periodically by the other primary adjustable BOAS 546 installed around the case 512. If a change in the blade clearance is detected, it indicates that the associated BOAS 546, 548 is displaced. Upon detection of displacement, the displaced BOAS can be re-positioned by operation of the associated actuator until the required desirable clearance is achieved. Further, displacement of BOAS can be monitored through the edge position sensors of the primary and second BOAS 546, 548. That is, when one BOAS adjusts relative to an adjacent BOAS, the signal strength of the adjacent edge position sensors will change, and thus the displacement can be detected.

For example, as shown in FIG. 5, the initially measured first primary adjustable BOAS 546a is located at the 12 o'clock position. Neighboring the first primary adjustable BOAS 546a is the first secondary adjustable BOAS 548a. The position of the first secondary adjustable BOAS 548a relative to the first primary adjustable BOAS 546a can be monitored by the edge position sensors of the two BOAS. The position of the first secondary adjustable BOAS can be checked and "aligned" (e.g., moved by operation of an associated actuator) so that the position (and thus blade clearance) matches the radial clearance as set by the first primary adjustable BOAS 546a. Once the first secondary adjustable BOAS 548a has been properly adjusted based on the first primary adjustable BOAS 546a, the process continues to the next adjacent BOAS (e.g., second secondary adjustable BOAS 548b). The second secondary adjustable BOAS 548b is adjusted so that the edge position sensors between the first secondary adjustable BOAS 548a and the second secondary adjustable BOAS 548b is optimized such that it indicates the second secondary adjustable BOAS 548a is moved to achieve the desired blade clearance. Next, the edge position sensors of the third secondary adjustable BOAS 548c and the second secondary adjustable BOAS 548b are monitored, and the position of the third secondary adjustable BOAS 548c is adjusted, such that the signal strength between the edge position sensors is optimized, and the desired blade clearance is achieved for the third secondary adjustable BOAS 548c.

The third secondary adjustable BOAS 548c can further be measured again by monitoring the signal strength of the edge position sensors of the third secondary adjustable BOAS 548c and the second primary adjustable BOAS 546b. As shown in FIG. 5, the second primary adjustable BOAS 546b is located at a 3 o'clock position. Thus, the desired blade clearance can be achieved by periodically or continuously monitoring and adjusting the primary adjustable BOAS 546 and then monitoring and adjusting the secondary adjustable BOAS 548 using the edge position sensors of the BOAS.

In the embodiment of FIG. 5, the BOAS position and blade clearance checking and monitoring is performed in a clockwise manner. That is, a primary adjustable BOAS 546 about the case 512 is checked for blade clearance and appropriately adjusted. Then, each subsequent secondary adjustable BOAS 548 in a clockwise manner is checked and adjusted.

Figure 6:
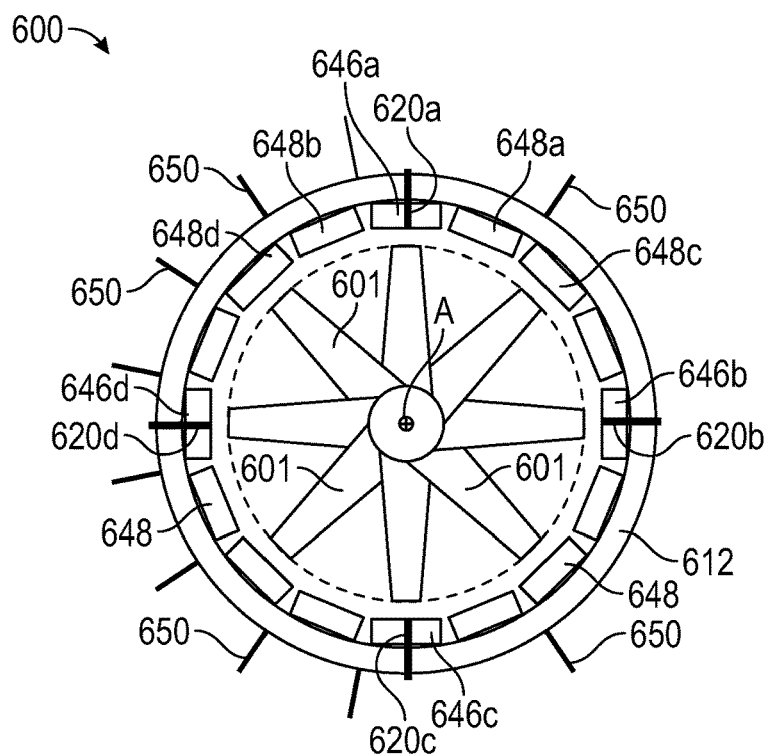
FIG. 6 is a schematic illustration of a gas turbine engine configured with an alternative non-limiting embodiment of the present disclosure.

Another, alternative configuration in accordance with a non-limiting embodiment of the present disclosure is shown in FIG. 6. In FIG. 6, a rotor case 612 of a gas turbine engine 600 in accordance with an embodiment of the present disclosure is shown. The engine 600 includes a plurality of blades 601 disposed radially about an engine axis A. A plurality of primary adjustable BOAS 646 and secondary adjustable BOAS 648 are distributed about the case 612, with each adjustable BOAS having a similar configuration as that described with respect to FIG. 5. A plurality of antennas 650 are also distributed about the case 612 and are configured to monitor signal strength of adjacent edge position sensors of the adjustable BOAS 646, 648.

In contrast to the embodiment of FIG. 5, in FIG. 6, a clockwise adjustment pattern is not used. In this configuration, a blade clearance of the first primary adjustable BOAS is measured and adjustable appropriately. Thus, the initial blade clearance measurement can be measured and set. However, in this embodiment, the adjustment of the secondary adjustable BOAS 648 is performed in both directions away from a primary adjustable BOAS 646.

For example, with reference to FIG. 6, a first secondary adjustable BOAS 648a, which is clockwise with respect to the first primary adjustable BOAS 646a, is checked using the edge position sensors of the first primary adjustable BOAS 646a and the first secondary adjustable BOAS 648a. Then, the process moves counter-clockwise, wherein the second secondary adjustable BOAS 648b is counter-clockwise adjacent the first primary adjustable BOAS 646a. After adjustment of the second secondary adjustable BOAS 648b, the process moves to the third secondary adjustable BOAS 648c, which is clockwise-adjacent to the first secondary adjustable BOAS 648a, and the edge position sensors therebetween are used to adjust the third secondary adjustable BOAS 648c. Then, moving to the other side (e.g., counter-clockwise), a fourth secondary adjustable BOAS 648d is compared to the second secondary adjustable BOAS 648b using the edge position sensors therebetween. That is, the fourth secondary adjustable BOAS 648d is counter-clockwise-adjacent the second secondary adjustable BOAS 648b and adjusted in position for blade clearance based thereon.

Those of skill in the art will appreciate that various other processes and/or patterns can be used for adjusting BOAS and ensuring a desired blade clearance around at rotor of a gas turbine engine without departing from the scope of the present disclosure. For example, any other configuration and implementation of the proposed algorithm (e.g., order of adjustments of adjacent BOAS) which optimizes the overall performance of the adjustment of BOAS and maintains a desired blade clearance is equally plausible and contemplated within the scope of the present disclosure.

The edge position sensors of the present disclosure can be any type and/or design of a position sensor that can optimizes detection, response time, and accuracy of edge position of adjacent BOAS. In one non-limiting example, surface acoustic wave (SAW) sensors can be used as the edge position sensors. SAW sensors can have a compact size, multi-functionality (e.g., can detect position, pressure, temperature, etc.), and, in some configurations, may not require wires or leads for communications and/or power. For example, powering antennas (e.g., antennas 550, 650) can be easily positioned at regular intervals around the rotor case. In some embodiments, each antenna can be multiplexed (to serve at least two SAW sensors), thus further reducing the number of antennas required for the BOAS blade-tip clearance systems. For example, in some embodiments, a single antenna positioned on a case can be used to power two adjacent edge position sensors, with each edge position sensor on a different BOAS. Further, in some embodiments, a single antenna can be used to power the edge position sensors of multiple BOAS and/or on both edges of one or more BOAS.

In one non-limiting example, radial clearances (e.g., blade clearance) between the blade tips and the BOAS may range from about 0.0254 mm (about 0.001 inches) to about 2.54 mm (about 0.100 inches) and, in some configurations, less than about 0.7 mm (about 0.023 inches). For modern, highly-efficient, high-pressure ratio (HPR) small engine cores, even smaller clearances may be preferred at about 0.254 mm (about 0.010 inches). That is, as will be appreciated by those of skill in the art, different blade clearances may be desirable for different engine architectures and/or types. Embodiments provided herein are configured to maintain blade clearances of all BOAS within the desired blade clearances and can be employed on any type of engine architecture, type, or configuration.

Although described above with respect to a radial clearance being an absolute distance between a BOAS surface (e.g., BOAS inner diameter surface 328b and a blade tip 330 as shown in FIG. 3B), such measurement may not be the only measurement variable. For example, in some configurations, the blade clearance can be calculated as a percentage of a respective blade chord (e.g., a chord of the blade 301 in FIG. 3B). In such example, for instance, a radial clearance of 0.508 mm (0.020 inches) may not indicate a significant leakage loss for a long blade with a chord of 254 mm (10 inches) (i.e., (0.020 in/10 inches)×100%=0.2%), while the same radial clearance of 0.508 mm (0.020 inches) for a short blade whose chord is only 25.4 mm (1 inch) may be close to 2%. Such percentage (e.g., 2%) can generate or enable a significant aerodynamic loss which is desired to be avoided.

Figure 7:
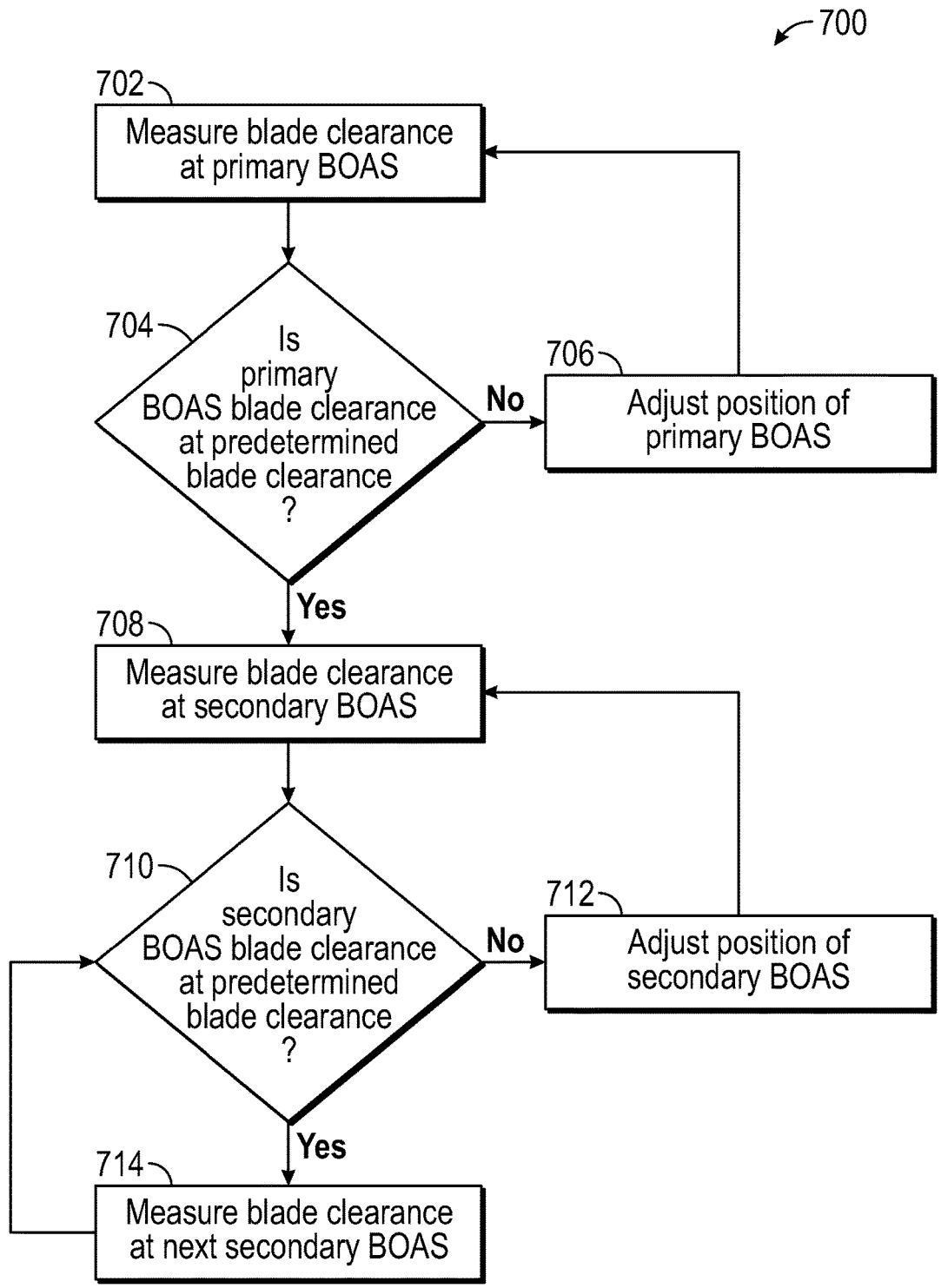
FIG. 7 is a flow process for controlling BOAS-blade tip clearances in accordance with an embodiment of the present disclosure.

Turning now to FIG. 7, a flow process in accordance with an embodiment of the present disclosure is illustrated. Flow process 700 can be employed by various engine configurations and architectures and thus is not limited to the specific embodiments of the present disclosure. The flow process 700 can be performed and/or executed using one or more controllers and/or processors that are in communication with a plurality of BOAS as configured as described above. That is, the BOAS that are employed in flow process can include primary BOAS having actuators, distance measurement device, and edge position sensors, secondary BOAS having actuators and edge position sensors, and antennas configured to communicate with the sensors, probes, etc. and/or power the same.

At block 702, a blade clearance of a primary BOAS is measured. Measurement of the primary BOAS blade clearance can be achieved using a distance measurement device that can measure a distance between a BOAS and a blade tip.

At block 704, a controller or other processor determines if the measured primary BOAS blade clearance is at a predetermined or desired blade clearance. The predetermined blade clearance can be set or based on the configuration of the engine in which the flow process 700 is employed (e.g., as described above). The predetermined blade distance can be a maximum or optimal blade clearance distance. In some embodiments, the predetermined blade distance is an absolute or maximum value maximum, and the determination at block 704 is determining if the measured blade distance is at or below the predetermined blade distance. In other embodiments, the predetermined blade distance may be a range such that there is a minimum distance which is undesirable and a maximum distance which is undesirable. Such minimums may be based on avoiding contact between a blade tip and a BOAS, and the maximums may be based on minimizing aerodynamic losses or tip leakage.

If, at block 704, it is determined that the primary BOAS blade clearance is not at the predetermined distance, at block 706, the position of the primary BOAS relative to a blade tip is adjusted. The adjustment may be by operation of an actuator that is controlled by a controller or other processor. In some embodiments, the controller can be a BOAS clearance controller, as described above. The adjustment of the BOAS may be radially inward (relative to an engine axis) and thus reduce the blade clearance, or radially outward and thus increase the blade clearance.

After adjustment of the primary BOAS at block 706, the flow process 700 returns to block 702 to measure the clearance at the primary BOAS, and then again check if the primary BOAS blade clearance is at the predetermined distance, at block 704.

When it is determined that the primary BOAS blade clearance is at the predetermined distance, the flow process 700 continues to block 708. At block 708, a measurement is made regarding a blade clearance of a secondary BOAS that is adjacent the primary BOAS. In some embodiments, the measurement at block 708 can be achieved using a distance measurement device similar to that described above, or in other embodiments can be based on edge position sensors (or a combination thereof). In some embodiments, the measurement of the position of the secondary BOAS can be based on detecting and measuring a signal strength that is achieved between adjacent edge position sensors of the primary BOAS and the secondary BOAS. The signal strength may be proportional to the relative positions of the secondary BOAS and the primary BOAS. In some embodiments SAW sensors can be used as the edge position sensors which can be powered by antennas located about a case of an engine. In some embodiments, as described above, multiple pairs of edge position sensors can be configured on adjacent edges of adjacent BOAS, and thus a direction or relative position of the BOAS can be detected and used for adjusting the position of the BOAS.

At block 710, a determination is made whether the measured blade clearance of the secondary BOAS is at the predetermined blade clearance distance.

If it is determined that the secondary BOAS is not at the predetermined blade clearance at block 710, the flow process 700 continues to block 712. At block 712, the position of the secondary BOAS is adjusted (e.g., inward or outward) to adjust the blade clearance. Once adjustment is complete, the flow process 700 returns to block 708 and the blade clearance of the secondary BOAS is measured again (block 708) and a determination is made whether the measured blade clearance of the secondary BOAS is at the predetermined value (block 710).

If, at block 710, it is determined that the secondary BOAS blade clearance is at the predetermined blade clearance, then the flow process continues to block 714. At block 714, a measurement is made of a blade clearance of a next adjacent secondary BOAS. That is, based on the first measured and properly adjusted/positioned secondary BOAS, a second secondary BOAS can be adjusted using adjacent edge position sensors and an actuator. Blocks 708-714 can be repeated any number of times, based on the number of secondary BOAS to be adjusted.

The flow process 700 can be repeated periodically, continuously, at a predetermined interval, and/or based on situational or criteria threshold (e.g., certain flight conditions) during operation of a gas turbine engine such that the blade clearances between BOAS and blade tips can be maintained at desired or predetermined distances. Accordingly, minimizing tip leakage and other losses as well as preventing contact between the blade tips and the BOAS can be achieved.

The flow process 700 can include additional and/or alternative steps without departing from the scope of the present disclosure. In some embodiments, the logic may include steps related to the order configuration of FIG. 6, described above. Further, certain modifications of the proposed logic can be employed to address various off-design operational conditions (e.g., extreme engine transients).

Although described herein, in some embodiments, as a sequential or ordered process, those of skill in the art will appreciate that the processes of adjustment may be performed simultaneously for the BOAS or substantially simultaneously. For example, in one non-limiting embodiments of a simultaneous adjustment configuration, the adjustment is performed for two adjacent BOAS (e.g., on either side of the primary BOAS). For example, with reference to FIG. 6, the two secondary BOAS 648a, 648b (on the right and left of primary BOAS 646a) can be adjusted (i) with a right-edge sensor of primary BOAS 646a and a left-edge sensor of first secondary BOAS 648a (for adjusting first secondary BOAS 648a) and (ii) with a left-edge sensor of primary BOAS 646a and a right-edge sensor of second secondary BOAS 648b (for adjusting second secondary BOAS 648b). Such simultaneous adjustment can then be carried out for the next set of adjustable BOAS (i.e., both third and fourth secondary BOAS 648c, 648d), etc.

Further, although described herein with a single or uniform blade clearance (i.e., all BOAS are adjusted to a single and uniform blade clearance around the circumference of the blades), embodiments of the present disclosure can be employed to enable different clearance for different BOAS at the same stage within a gas turbine engine. For example, a first primary BOAS can be set or configured to adjust to a first predetermined blade clearance and a second primary BOAS can be set or configured to adjust to a second (e.g., different) predetermined blade clearance. Then, when the process described above is employed, the secondary BOAS that are adjusted based on the first primary BOAS will be adjusted to the first predetermined blade clearance and the secondary BOAS that are adjusted based on the second primary BOAS will be adjusted to the second predetermined blade clearance. Further, any number of primary BOAS and/or associated secondary BOAS can be employed to achieve a desired BOAS adjustment architecture. Such variable or different predetermined blade clearances can be employed, for example, during severe engine transients.

Further, although described herein with respect to a radial adjustment of the BOAS (e.g., using radially aligned and oriented actuators) other directional movements are enabled herein. For example, all BOAS move in the lateral and axial directions as well (e.g., side-to-side (circumferentially) and forward-and-backward along the axis of the engine). Further, the case hooks onto which the BOAS are suspended allow for small clearances and movements of the BOAS. Accordingly, in some embodiments, the sensors and probes can be used to detect the BOAS lateral and axial movements (in addition to radial movements) or additional sensors or probes can be installed within the BOAS. In such configurations, one or more additional actuators may be required to enable the appropriate and respective BOAS adjustments. In alternative embodiments, multi-axis actuators may be employed to enable multi-direction movement and adjustment of the BOAS.

Advantageously, embodiments described herein provide improved blade clearance control of a turbine engine by adjusting the clearance distances between BOAS and blade tips to minimize leakage/loss and/or prevent contact between the blade tips and the BOAS. Further, advantageously, embodiments provided herein can reduce the number of holes drilled into a rotor case because fewer external blade-tip clearance distance measurement device are needed. That is, because of the edge position sensors of the BOAS blade-tip clearance systems of the present disclosure, only one or a few BOAS need to be configured as a primary BOAS (e.g., having distance measurement device) and all other BOAS of the engine can be configured as secondary BOAS (e.g., without distance measurement devices).

For example, in some embodiments, four distance measurement device can detect "out-of-roundness" oval shaping and second order effects on the rotor case during operational engine transients, such that all BOAS can be appropriately adjusted (e.g., FIGS. 5-6).

Further, advantageously, in accordance with some embodiments, the use of SAW sensors embedded in the BOAS edges (both primary and secondary BOAS) are compact, light-weight, and do not require wiring. Moreover, use of SAW sensors advantageously enables positioning SAW sensor powering antenna(s) anywhere around the rotor cases. Furthermore, a reduced (or relatively low) number of antennas can be employed because each antenna can be multiplexed to serve the SAW sensors of each pair of adjacent BOAS.

Furthermore, advantageously, embodiments provided herein enable diminished overall blade tip leakage losses due to tighter and better controlled blade clearances. Accordingly, an improved overall engine thermodynamic cycle performance can be achieved.

Advantageously, embodiments provided herein can enable a capability for the detection of and monitoring of "unhealthy" BOAS. That is, early detection of potentially failing BOAS due to thermal edge erosion, localized "hot spots," cracks, etc. can be monitored and detected.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, embodiments of the present disclosure can be applied to both experimental test rigs for development programs as well as in production components. Further, embodiments provided herein can be applied to both aero- and land-based gas turbine engines where detection and control of turbine blade tip-to-BOAS clearances are desired or required.

Accordingly, the present disclosure is not to be seen as limited by the foregoing description, but is only limited by the scope of the appended claims.

What is claimed is:

1. A method to control a blade outer air seal (BOAS)-to-blade-tip clearance of a gas turbine engine comprising:
   measuring a blade clearance between a first primary BOAS and a blade of the gas turbine engine with a first distance measurement device;
   determining if the measured blade clearance of the first primary BOAS is at a value corresponding to a first predetermined blade clearance;
   measuring a blade clearance of a first secondary BOAS that is circumferentially adjacent the first primary BOAS based on a position of the first primary BOAS when the blade clearance of the first primary BOAS is at the first predetermined blade clearance;
   determining if the measured blade clearance of the first secondary BOAS is at a value corresponding to the first predetermined blade clearance; and
   adjusting the position of the first secondary BOAS when the blade clearance of the first secondary BOAS is not at the first predetermined blade clearance with an actuator operably connected to the first secondary BOAS.

2. The method of claim 1, wherein the first distance measurement device is attached to the first primary BOAS.

3. The method of claim 1, further comprising adjusting the position of the first primary BOAS with an actuator operably connected to the first primary BOAS when the measured blade clearance of the first primary BOAS is not at a value corresponding to the first predetermined blade clearance.

4. The method of claim 1, further comprising measuring a blade clearance of a second secondary BOAS that is circumferentially adjacent the first secondary BOAS based on a position of the first secondary BOAS when the measured blade clearance of the first secondary BOAS is at a value corresponding to the first predetermined blade clearance.

5. The method of claim 1, further comprising adjusting a number of secondary BOAS with associated actuators such that each secondary BOAS is positioned at a value corresponding to the first predetermined blade clearance, wherein the position of each secondary BOAS is based on the position of the first primary BOAS.

6. The method of claim 5, wherein the number of secondary BOAS are located between the first primary BOAS and a second primary BOAS, the method further comprising confirming the position of a secondary BOAS adjacent to the second primary BOAS based on a position of the second primary BOAS.

7. The method of claim 1, wherein measuring the blade clearance of the first secondary BOAS comprises using an edge position sensor installed on the first secondary BOAS.

8. The method of claim 1, wherein measuring the blade clearance of the first secondary BOAS comprises detecting a signal strength between an edge position sensor on a circumferentially facing edge of the first primary BOAS and an edge position sensor on an adjacent circumferentially facing edge of the first secondary BOAS.

9. The method of claim 8, further comprising powering the edge position sensors wirelessly from an antenna.

10. The method of claim 1, the further comprising:
measuring a blade clearance between a second primary BOAS and a blade of the gas turbine engine with a second distance measurement device;
determining if the measured blade clearance of the second primary BOAS is at a value corresponding to a second predetermined blade clearance;
measuring a blade clearance of a second secondary BOAS that is circumferentially adjacent the second primary BOAS based on a position of the second primary BOAS when the blade clearance of the second primary BOAS is at the second predetermined blade clearance;
determining if the measured blade clearance of the second secondary BOAS is at a value corresponding to the second predetermined blade clearance; and
adjusting the position of the second secondary BOAS when the blade clearance of the second secondary BOAS is not at the second predetermined blade clearance with an actuator operably connected to the second secondary BOAS.

11. A blade outer air seal (BOAS) blade-tip clearance system of a gas turbine engine, the BOAS blade-tip clearance system comprising:
a first primary BOAS having an inner diameter surface and an outer diameter surface relative to an engine axis, the first primary BOAS including:
an actuator operably coupled to the outer diameter surface of the first primary BOAS and operable to move the first primary BOAS at least toward or away from the engine axis; and
at least one edge position sensor located on a circumferentially facing edge of the first primary BOAS; and
a first distance measurement device configured to detect and measure a distance from the inner diameter surface of the first primary BOAS to a blade tip of a blade of the gas turbine engine;
a first secondary BOAS having an inner diameter surface and an outer diameter surface relative to an engine axis and circumferentially adjacent the first primary BOAS, the first secondary BOAS including:
an actuator operably coupled to the outer diameter surface of the first secondary BOAS and operable to move the first secondary BOAS at least toward or away from the engine axis; and
at least one edge position sensor located on a circumferentially facing edge of the first secondary BOAS; and
a BOAS clearance controller configured to control the actuators of the first primary BOAS and the first secondary BOAS, and the BOAS clearance controller is configured to:
measure a blade clearance between the first primary BOAS and a blade of the gas turbine engine using the first distance measurement device;
determine if the blade clearance of the first primary BOAS is at a first predetermined blade clearance;
measure a blade clearance of the first secondary BOAS that is based on a position of the first primary BOAS and the edge position sensors when the blade clearance of the first primary BOAS is at the first predetermined blade clearance;
determine if the blade clearance of the first secondary BOAS is at the first predetermined blade clearance; and
adjust the position of the first secondary BOAS by controlling the actuator of the first secondary BOAS when the blade clearance of the first secondary BOAS is not at the first predetermined blade clearance.

12. The system of claim 11, wherein the first distance measurement device is attached to the first primary BOAS.

13. The system of claim 1, further comprising, when the blade clearance of the first primary BOAS is not at the first predetermined blade clearance, the BOAS clearance controller controls the actuator of the first primary BOAS to adjust the position of the first primary BOAS.

14. The system of claim 11, wherein, when the blade clearance of the first secondary BOAS is at the first predetermined blade clearance, the BOAS clearance controller is configured to measure a blade clearance of a second secondary BOAS that is circumferentially adjacent the first secondary BOAS based on a position of the first secondary BOAS.

15. The system of claim 11, further comprising a number of secondary BOAS, wherein the BOAS clearance controller is configured to adjust a number of secondary BOAS such that each secondary BOAS is at the first predetermined blade clearance, wherein the position of each secondary BOAS is based on the position of the first primary BOAS.

16. The system of claim 15, further comprising a second primary BOAS, wherein the number of secondary BOAS are located between the first and second primary BOAS, wherein the BOAS clearance controller confirms the position of a secondary BOAS adjacent to the second primary BOAS based on a position of the second primary BOAS.

17. The system of claim 16, further comprising a second distance measurement device attached to the second primary BOAS.

18. The system of claim 11, wherein measuring the blade clearance of the first secondary BOAS comprises detecting a signal strength between the edge position sensors on the first primary BOAS and the first secondary BOAS.

19. The system of claim 18, further comprising at least one antenna configured to wirelessly power the edge position sensors.

20. The system of claim 11, wherein the first distance measurement device is at least one of a proximity probe, a laser device, an acoustic device, or a pressure device.

* * * * *